June 22, 1954
L. D. SMULLIN
2,682,033
MICROWAVE Q METER
Filed Feb. 9, 1951
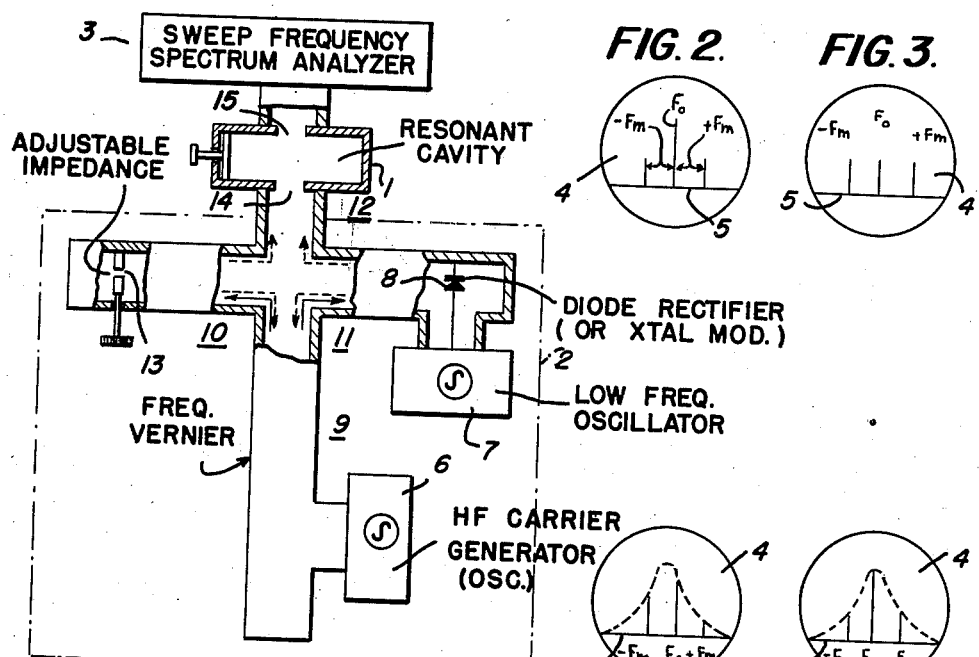
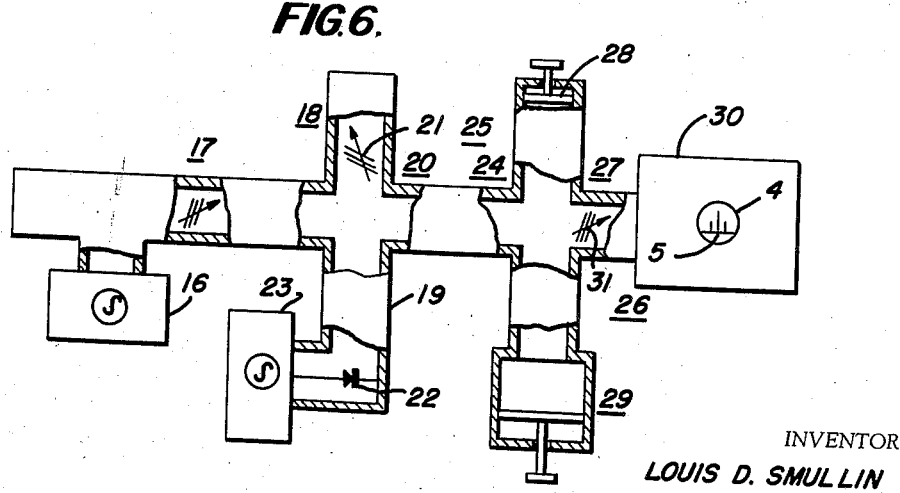
INVENTOR
LOUIS D. SMULLIN
BY
*N. W. Helvestine*
*George Sipkin*
ATTORNEYS Patented June 22, 1954

2,682,033

UNITED STATES PATENT OFFICE 2,682,033

MICROWAVE Q METER

Louis D. Smullin, Watertown, Mass., assignor, by mesne assignments, to the United States of America as represented by the Secretary of the Navy Application February 9, 1951, Serial No. 210,135

14 Claims. (Cl. 324—58)

This invention relates to microwave apparatus, and more especially to apparatus employing high precision and high "Q" cavities.

In microwave systems such as microwave frequency discriminators and the like, it is very frequently necessary to make accurate measurements of the "Q" of a resonant cavity, particularly where the "Q" may have a value of the order of 10,000 or more.

Accordingly, one of the principal objects of this invention is to provide an improved method and apparatus for measuring the "Q" of resonant cavities and the like, particularly those cavities having a "Q" of a very high order.

Another object is to provide an arrangement for measuring the "Q" of a resonant cavity by employing a modulated oscillator which is coupled to the cavity by a special wave guide system of the T-junction type.

Another object is to provide an improved arrangement for measuring the "Q" of a resonant cavity or the like in terms of the reactance function of the cavity.

A feature of the invention relates to an adjustable frequency arrangement for measuring the "Q" of a resonant cavity or the like, employing a fixed frequency microwave oscillator and an adjustable low frequency source of oscillations for modulating the energy from the microwave source under control of a special T-junction wave guide.

Another feature relates to what may be termed an electronic frequency vernier for supplying test frequencies to a microwave system, whereby frequency differences of the order of 100 kilocycles per second out of a range of 5,000 megacycles per second can be obtained with an overall accuracy of about 1%.

Another feature relates to a novel impedance bridge arrangement for use at microwave frequencies using a so-called "magic T" wave guide.

A still further feature relates to the novel organization, arrangement and interconnection of parts which cooperate to form an improved arrangement for measuring the "Q" of a resonant cavity or the like.

In the drawing,

Fig. 1 is a schematic diagram of a microwave "Q" measuring system.

Figs. 2–5 are pictorial representations of the frequency indicator shown diagrammatically in Fig. 1.

Fig. 6 is a preferred modification of Fig. 1.

Referring to Fig. 1, the block 1 represents schematically any well-known form of resonant cavity whose "Q" is to be measured. The input of the cavity is connected to what may be termed an electronic frequency vernier 2, and the output of the cavity is connected to any well-known frequency spectrum analyzer 3. For example, analyzer 3 may take the form of a cathode ray oscilloscope tube, the scanning beam of which is deflected across the face or luminescent screen 4 (Figs. 2–5) of the tube at a predetermined rate to provide a suitable time base line 5, for example by applying a suitable saw-tooth wave to the usual horizontal deflector plates. The frequency spectrum to be analyzed is applied to the cooperating vertical deflector plates to produce vertical linear traces, three of which are shown in Figs. 2–5 and designated $F_o$, $-F_m$ and $+F_m$. If desired, the base line 5 can be associated with a suitable frequency-graduated scale. It will be understood, of course, that any other form of oscillograph can be employed as the spectrum analyzer.

The electronic frequency vernier 2, according to the invention is based upon the adjustable production of sidebands of a high frequency carrier, e. g. 5,000 mc./sec. under control of an adjustable low frequency modulating oscillator which, for example, can be adjusted from 0.1 to 1 mc./sec., where mc. designates megacycles. For this purpose, there is provided a high frequency carrier generator 6 of any well-known type, and a low frequency oscillator 7 also of any well-known type. The generator 6 is a stabilized high frequency oscillator of $F_o$ frequency, and the oscillator 7 has an adjustable $F_m$, then the sideband frequencies will be $F_o \pm F_m$. Since commercial low frequency oscillators have accuracies of better than 1%, the error in the sideband increments will be about 1% of $F_m/F_o$. In one practical example this error was found to be about $\pm 2 \times 10^{-5}\%$, plus the percentage drift in oscillator 6.

In order to effect the modulation, I prefer to use a diode rectifier 8, such for example as a diode tube of the well-known "lighthouse" construction, where $F_o$ is in the range of approximately 2,000 megacycles per second. If $F_o$ is above 2,000 megacycles per second, it is preferable to use a contact silicon crystal for the modulator 8. In order to achieve the best results, it is necessary to employ a modulation circuit which provides independent control of the carrier amplitude ($F_o$) with respect to the sideband amplitudes ($F_o-F_m$ and $F_o+F_m$). For this purpose the oscillators 6 and 7 are coupled to the modulator 8 by a microwave impedance bridge such as the so-called "magic-T" wave guide. This bridge has four wave guide arms, 9, 10, 11, 12 and has the property that microwave power fed for instance into arm 9, will divide equally between the two laterally adjacent arms 10, 11 but none is coupled directly to the opposite arm 12. If the laterally adjacent arms 10, 11, are each respectively terminated in equal impedances located at equal distances from the common junction of the four arms, no power will go from arm 9 into arm 12, even though these terminating impedances are different from the line admittance $Y_0$ of arm 9. However, both arms 9 and 12 will receive reflected energy. In general, the voltage $\Gamma_{10}$ reflected from arm 10, and the voltage $\Gamma_{11}$ reflected from arm 11, into arms 9 and 12, are such that $$e_{12} = \frac{(\Gamma_{10} - \Gamma_{11})}{\sqrt{2}}$$

and $$e_9 = \frac{\Gamma_{10} + \Gamma_{11}}{\sqrt{2}}$$

It will be assumed that the carrier signal $F_0$ from source 6 and of amplitude $E_0$ is fed into arm 9 so that the generator impedance is matched to the impedance of arm 9. This signal splits at the T-junction, and each half of the power goes into arms 10 and 11 respectively. Arm 10 is terminated in an adjustable passive impedance 13, such for example as a so-called resistance card or adjustable iris or slit. Arm 11 is terminated in the diode or crystal rectifier 8. In accordance with one aspect of the invention, the diode or crystal rectifier 8 has its dynamic impedance adjusted periodically by feeding into it the low frequency modulating signal from source 7. This periodic impedance variation is equivalent to a corresponding periodically varying reflection coefficient for the incident carrier wave $F_0$ from source 6. As a result, the reflected energy is amplitude-modulated at a frequency $F_m$, and it may be represented as a carrier $F_0$ with sidebands $F_0 \pm F_m$, $F_0 \pm 2F_m$, ... etc.

With 100% modulation, the carrier power will be about 6 decibels greater than the power in either of the sidebands. For the purposes of the present invention, it is desirable to make the carrier amplitude and the sideband amplitudes equal. This can be accomplished by adjusting the impedance in arm 10 by means of element 13, to give a reflected carrier wave that partially cancels the reflected carrier wave from arm 11. This does not affect the sideband amplitude, since the reflection from arm 10 is unmodulated, and therefore allows continuous control of the carrier power delivered to arm 12. In fact, the carrier power can, with this arrangement, be suppressed to more than 40 decibels below the power in the sidebands.

In order to view the three signals ($F_0$, $F_0+F_m$, $F_0-F_m$) simultaneously, the power in arm 12 is passed through the resonant cavity 1 into the spectrum analyzer 3. As mentioned above, this analyzer may include any well-known sweep-frequency superheterodyne radio receiver and cathode ray tube oscillograph similar to the well-known "panoramic" receivers. A frequency range of about 30 megacycles per second at 5,000 megacycles per second can be displayed on the luminescent screen 4 of the cathode ray tube. Preferably, the radio frequency inputs to the "panoramic" receiver are each provided with respective calibrated attenuators so that the signal amplitudes of the sidebands can be compared.

Fig. 2 shows the visual appearance of the three signals ($F_0$, $F_0-F_m$, $F_0+F_m$) from arm 12, as viewed on the screen of the oscilloscope, when the carrier ($F_0$) is of larger amplitude than the sidebands. Fig. 3 shows the appearance when the carrier amplitude and sideband amplitudes are equal. This latter condition is that required for the measurement of the "Q" of cavity 1. Thus, there are obtainable three signals of equal amplitude but spaced apart in frequency by the amount $F_m$. When these three signals are transmitted through the resonant cavity 1, there will be obtained different patterns, depending upon whether or not the cavity is tuned to $F_0$. The visual pattern produced when the cavity 1 is resonant at a frequency different from $F_0$, is shown in Fig. 4; the pattern obtained when the cavity is tuned to $F_0$, is shown in Fig. 5. This latter condition is most sensitively indicated by tuning cavity 1 until the sideband amplitudes are equal, since the rate of change of transmission through the cavity with frequency, is much greater near the half power points, than at resonance. Therefore, by adjusting $F_m$ until the sideband transmission through the cavity is half that at resonance, there is obtained a direct measure of the "Q" of the cavity.

Thus $$Q_{L2} = F_0/2F_m \quad (1)$$

where $Q_{L2}$ is the "Q" of the cavity 1 loaded by a matched generator and output line.

If the input window 14 to the cavity is equal in size to the output window 15; or if the coupling is effected by inductive input and output pick-up loops of equal size, the unloaded $Q_0$ of the cavity is obtained from the following formula:

$$Q_0 = Q_{L2}\left(\frac{1}{1-T}\right) \quad (2)$$

where "T" is the power transmission ratio (less than 1).

In the foregoing, the "Q" of the cavity 1 is measured by transmission through the cavity. Fig. 6 shows an arrangement for measuring the "Q" of a resonant cavity in terms of its reactance. The impedance of a cavity may be measured in terms of standing wave ratio and phase. However, that is a slow process, and because it requires point-by-point measurements along a standing wave line, it is unreliable for high-Q cavities since small changes of $F_0$ or of cavity resonance caused by mechanical vibrations and the like, vitiate the measurements. These difficulties are overcome with the arrangement of Fig. 6.

In Fig. 6, the power from the microwave oscillator 16 of carrier frequency $F_0$ is fed into a "magic T" wave guide system comprising input arm 17, the laterally adjacent arms 18, 19, and the output arm 20 all having a common junction. The arm 18, is terminated in an adjustable passive impedance 21, and the arm 19 is terminated in the modulator 22 of the diode type or of the silicon contact rectifier type. As described in connection with Fig. 1, the dynamic impedance of modulator 22 is periodically varied under control of the low frequency waves ($F_m$) from the oscillator 23. The arm 20 feeds into another "magic T" wave guide comprising input arm 24, laterally adjacent arms 25, 26, and output arm 27. The arm 25 is terminated in an adjustable short circuit, for example by the adjustable plug 28 to provide a wave transmission line section of the proper length to act as an effective short circuit. The arm 26 is terminated in the adjustable resonant cavity 29, where the arm 27 is coupled to the frequency spectrum analyzer 30 preferably through an adjustable passive impedance 31.

Consider, for purposes of explanation, that two waves of equal phase and amplitude enter arms 25 and 26 from arm 24. The wave entering arm 25 is completely reflected at the short circuit 28. The wave entering arm 26 is partially reflected by the admittance of cavity 29, namely $y_c = g + jb$, it being understood that all the admittances are normalized with respect to the wave guide admittance. The reflection from the cavity is $$\Gamma_{26} = \frac{1-g-jb}{1+g+jb} \quad (3)$$

while the reflection from the short circuit is unity. The short circuit is adjusted by movement of plug 28 so that with cavity 29 detuned (i. e. with $b=\infty$) the power into arm 27 is zero, where $$e_{27} = \Gamma_{25} - \Gamma_{26} = 1 - \Gamma_{26} \quad (4)$$

As the cavity is adjusted towards resonance then $$e_{27} = \frac{2}{1+g+jb}$$

$$|e_{27}|^2 = \frac{4}{(1+g)^2 + b^2} = P \quad (5)$$

The power "P" into arm 27 will be maximum for $b=0$ and will be half its maximum value for $|b| = |1-g|$. The power at resonance will be $$P_o = \frac{4}{(1+g)^2} \quad (6)$$

Thus, $P_o$ is a measure of the cavity conductance "$g$," because it is only necessary to detune the cavity and move the plunger 28 until maximum transmission into arm 27 occurs to determine the level $P_o^1 = 4$ which corresponds to $g=0$.

The "Q" of a cavity loaded only at its input terminals, as in Fig. 6, by a matched generator is defined by the formula $$b = 2(g+1)Q_{L1}\frac{\Delta F}{F_o} \quad (7)$$

Consequently, if one measures the bandwidth between half power transmission ($2\Delta F$) into arm 27, the quantity $Q_{L1}$ is directly ascertainable, and the unloaded $Q_o$ of the cavity can be obtained by $$Q_o = Q_{L1}\frac{(g+1)}{(g)} \quad (8)$$

In operating the arrangement of Fig. 6 to measure the "Q" of cavity 29, the following procedure is followed.

1. With the cavity 29 detuned from $F_o$ and the plunger 28 adjusted for maximum signal in the analyzer 30, the input voltage level $E_o$ from oscillator 16, and the impedance 21 is adjusted, and the modulation level between 16 and 23 are adjusted to give three signals $(F_o, F_o+F_m, F_o-F_m)$ of equal height.

2. The amplitude of the signal and the attenuator setting on the intermediate frequency attenuators of the analyzer 30 are noted. This provides the calibration for $P_o$.

3. With the cavity 29 still detuned, the plunger 28 is adjusted until zero signal is produced at the analyzer 30.

4. The cavity 29 is then tuned for maximum amplitude of $F_o$ and for equal amplitudes for $(F_o-F_m)$ and $(F_o+F_m)$, and $F_m$ is adjusted until the power in each of the sidebands is one-half the power in the carrier.

5. From the formula $$Q_{L1} = \frac{F_o}{2F_m}$$

$$Q_o = Q_{L1}\frac{(g+1)}{(g)} = Q_{L1}\left(\frac{\sqrt{\frac{P_o^1}{P_o}}}{\sqrt{\frac{P_o^1}{P_o}}-1}\right)$$

where $$g = \sqrt{\frac{P_o^1}{P_o}} - 1$$

With the foregoing described method, it is possible with great accuracy to measure $Q_{L1}$, between 1000 and 30,000 at 5000 megacycles per second. The percentage of accuracy can of course be even further increased by more accurate stabilization of the frequency of oscillator 16.

For a detailed disclosure of a typical frequency spectrum analyzing arrangement, reference may be had to U. S. Patent No. 2,084,760, granted to Harold H. Beverage, June 22, 1937.

While certain particular embodiments have been described, it will be understood that various changes and modifications can be made therein without departing from the spirit and scope of the invention.

What I claim is:

1. Apparatus for measuring the "Q" of a cavity resonator comprising means for producing a high frequency carrier wave, means for amplitude-modulating said wave with an adjustable modulating frequency to produce upper and lower sidebands, means for adjusting the relative amplitudes of said carrier wave and sidebands, a frequency spectrum analyzer, coupling circuit means including said cavity resonator to be measured for applying the adjusted carrier wave and sidebands to said analyzer, and means for adjusting the resonance of said cavity resonator.

2. Apparatus, according to claim 1, in which the cavity resonator has an inlet and an outlet and the outlet is connected to the frequency analyzer.

3. Apparatus, according to claim 1, in which the cavity resonator has only an inlet which is connected to the coupling circuit means.

4. Apparatus for measuring the "Q" of a cavity resonator or the like, comprising means to supply high frequency wave energy to the cavity resonator, means to amplitude modulate the carrier wave energy to produce upper and lower sidebands which are also applied to the cavity resonator, means to adjust the carrier level applied to said resonator until the sidebands and carrier are of substantially the same level, and a frequency spectrum analyzer to which the said carrier and sidebands are simultaneously applied.

5. Apparatus for measuring the "Q" of a cavity resonator or the like, comprising means to supply high frequency carrier wave energy to the cavity resonator, means to amplitude modulate the carrier wave energy to produce upper and lower sidebands which are also supplied to the cavity resonator, means to adjust the carrier level supplied to said resonator until the sidebands and carrier are of substantially the same level, means to adjust the sideband frequency until the power in the sidebands transmitted through the cavity is approximately one-half the carrier power, and a frequency spectrum analyzer to which the carrier and sidebands from the cavity resonator are simultaneously applied.

6. Apparatus for measuring the "Q" of a cavity resonator or the like, comprising means to amplitude modulate a microwave carrier to produce upper and lower sidebands, means to adjust the carrier until the carrier level and the sideband levels are substantially equal, a frequency spectrum analyzer, means including said cavity resonator for simultaneously impressing the carrier and both sidebands upon said analyzer, and means to tune the cavity resonator until the indication on the frequency analyzer corresponding to the carrier is at a maximum.

7. Apparatus according to claim 6 in which means are provided for varying the modulation frequency until the sideband power is approximately one-half the carrier power.

8. Apparatus according to claim 6 in which said cavity resonator is connected between the source of the microwave carrier oscillations and the frequency analyzer to act as a transmission line element therebetween.

9. Apparatus according to claim 6 in which a wave guide system is provided for impressing the carrier and sidebands on said frequency analyzer, said wave guide system having oppositely disposed input and output arms and a pair of laterally adjacent side arms all said arms having a common junction, one of said lateral arms having a terminating impedance which is adjusted with relation to the tuning of the cavity resonator to control the levels of the carrier and the sidebands, said cavity resonator forming a terminating impedance for the other one of said lateral arms.

10. The method of measuring the "Q" of a cavity resonator and the like which comprises, supplying high frequency carrier wave energy to the resonator, amplitude-modulating the carrier wave energy to produce upper and lower sidebands which are also supplied to the resonator, adjusting the carrier until the sidebands and carrier are of substantially the same level, adjusting the sideband frequency until the power in the sidebands is approximately one-half the carrier power, and applying the carrier and adjusted sidebands from the resonator to a frequency spectrum analyzer.

11. The method of measuring the "Q" of a cavity resonator and the like which comprises, amplitude-modulating a microwave carrier to produce upper and lower sidebands, adjusting the carrier until the carrier level and the sideband levels are substantially equal, applying the three signals to a band-pass circuit including a cavity resonator to be measured, applying the three signals from said circuit to a frequency spectrum analyzer, tuning the cavity resonator until the indication corresponding to the carrier is at a maximum and varying said modulation frequency until the power in said sidebands is equal to one-half the power in said carrier.

12. The method of measuring the "Q" of a cavity resonator and the like by the use of three microwave signals which comprises, generating a microwave carrier of frequency $F_0$, generating a low frequency modulating signal of frequency $F_m$, applying the carrier to a microwave modulator of the intermodulation product type, simultaneously applying said modulating frequency to said modulator to periodically vary its dynamic impedance, reflecting the unmodulated carrier and the modulated carrier into a common wave guide junction, adjusting the degree of said reflections to produce said three signals $F_0$, $F_0-F_m$ and $F_0+F_m$ of equal amplitude at the output from said junction, supplying the three signals $F_0$, $F_0-F_m$ and $F_0+F_m$ to a circuit including said cavity resonator, applying the three signals from said circuit to a frequency spectrum analyzer and varying the frequency of $F_m$ to obtain half-power indications of $F_0+F_m$ and $F_0-F_m$ as compared with $F_0$ on said frequency spectrum analyzer.

13. The method of measuring the "Q" of a resonant circuit element which comprises amplitude-modulating a high frequency carrier wave to produce upper and lower sidebands, suppressing the level of the carrier to equal that of the produced sidebands applying said suppressed carrier and said sidebands to a circuit including said resonant circuit element, applying the output of said circuit to a frequency spectrum analyzer and varying the frequency of the amplitude modulation applied to the carrier.

14. The method of measuring the "Q" of a cavity resonator which comprises generating a high frequency carrier wave, amplitude-modulating said carrier wave to produce upper and lower sidebands, adjusting the carrier wave level to substantially the same level as the sidebands, applying the energy of the adjusted carrier and sidebands to a band-pass circuit including said resonator, applying the output of said circuit to a frequency spectrum analyzer, tuning said cavity to resonance at the carrier frequency and varying the modulation frequency until the sideband indications obtained on the frequency spectrum analyzer equal one-half that of the carrier frequency indication obtained.

References Cited in the file of this patent

UNITED STATES PATENTS

| Number | Name | Date |
|---|---|---|
| 2,411,289 | Mouromtseff et al. | Nov. 19, 1946 |
| 2,418,518 | McArthur | Apr. 8, 1947 |
| 2,431,339 | McCool | Nov. 25, 1947 |
| 2,457,673 | Hershberger | Dec. 28, 1948 |
| 2,484,256 | Vaughan | Oct. 11, 1949 |
| 2,498,548 | Howard | Feb. 21, 1950 |